Jan. 3, 1967 A. D. GRONNER 3,295,372
CAPACITANCE TYPE FLUID MEASURING APPARATUS
Filed July 1, 1964

INVENTOR
ALFRED D. GRONNER
BY *Edwin E. Greigg*
ATTORNEY

United States Patent Office 3,295,372
Patented Jan. 3, 1967

3,295,372
CAPACITANCE TYPE FLUID MEASURING APPARATUS
Alfred D. Gronner, White Plains, N.Y., assignor to Simmonds Precision Products, Inc., Tarrytown, N.Y., a corporation of New York
Filed July 1, 1964, Ser. No. 379,465
8 Claims. (Cl. 73—304)

The present invention relates to capacitance type fluid measuring apparatus and particularly to apparatus for indicating within prescribed limits of accuracy the mass of fluid in a container.

In the conventional rebalancing bridge type of capacitance gauge, a measuring condenser having spaced electrodes is immersed in the fluid in the container and its change in capacitance with change in liquid level is employed to control an indicator. For this purpose the measuring condenser is connected to one arm and a reference condenser to an opposing arm of a bridge circuit in which a pair of voltage sources constitute the other two arms. A phase sensitive detector-amplifier responsive to the bridge output is coupled to the rebalancing motor to vary the voltage applied to the reference condenser thereby maintaining bridge balance.

When a gauge of the above type is employed to measure the quantity of fuel in an aircraft fuel tank, it is now conventional practice to calibrate the indicator in terms of mass or weight. If the measuring condenser is profiled or characterized such that the dry capacitance of the immersed portion is at all times proportional to the corresponding volume of the associated tank, then it will provide an accurate indication of weight so long as it can be assumed that the capacity index $(K-1)/D$, where K and D are the dielectric constant and density of the fuel, respectively, is a constant. Unfortunately, this assumption is not valid in practice, particularly with the wide range of fuels now in use and some means is required to compensate for capacity index variation.

One method for solving the above-mentioned problem is described and claimed in the patent to Stanley J. Smith No. 3,022,665, wherein a circuit is provided utilizing an immersed reference condenser in combination with a fixed comparison condenser for achieving appropriate compensation. The accuracy of such arrangement is predicated upon the assumption of a linear relationship between the capacity index and the dielectric constant which assumption is valid within tolerable limits of accuracy.

Also, another method for overcoming the same problem is described and claimed in the application of Frederick L. Ryder, Ser. No. 739,337, filed June 2, 1958, and now Patent No. 2,981,105. It has been discovered, as shown in the Ryder patent, that the various fuels under consideration can be represented within predetermined tolerable limits by the general exponential equation $$K-1=(AD)^n$$

where A and $n$ have the approximate values, respectively, of 1.395 and 4/3 when D is expressed in terms of grams per cubic millilitre. In general, the values of A and $n$ can be varied depending on the range of fluids to be measured so long as $n$ has a value other than 0 or 1. Accordingly, a measuring condenser is provided whose capacitance varies as a function of $V^n$, where V is the volume of the fluid, and further that the readout system varies as a function of $Ye^{1/n}$, where Ye is the selected fraction of the electrical range of the potentiometer in the readout system. A gauge, therefore, is provided which operates in conformity with the relationship $K-1=(AD)^n$ to yield accurate indication of fluid mass or weight.

This latter method avoids the use of an additional compensating circuit with its associated comparison condenser as above-mentioned in the Smith patent. However, in accomplishing linearization between the measuring condenser performance and the ideal fluid exponential law $K-1=(AD)^n$, the Ryder patent must employ a complicated procedure in characterizing the readout system with the further need of characterizing the measuring condenser according to the relationship $$A'a=\frac{d[F(H)]^n}{dH}$$

where $A'$ is the effective cooperating width of the electrodes at any height, and F represents any function of the height H of the fluid in the container.

Therefore, the present system intends to solve the problem of compensation or linearization of the capacity of a measuring condenser and the mass of fluid in the container with that relation for the ideal fluid expressed by the exponential equation $K-1=(AD)^n$ in a simple, efficient and inexpensive manner.

It is the principal object of the present invention to avoid the complicated systems employed by the above-mentioned methods and yet achieve accurate measurement of the mass of fluids in terms of the capacity of a measuring condenser without the use of compensators.

It is yet another object to provide a totalizing measurement system for a plurality of fluid containers without the need for compensation circuits and utilizing a single simple circuit such as to afford a substantial reduction in weight and dimension in systems heretofore known.

Therefore, in accordance with one aspect of the present invention, a condenser is placed in series with the measuring condenser so that this series combination can be profiled to a certain hyperbolic function of the capacity of the measuring condenser chosen. If a fixed condenser of correct value is put in series with this measuring condenser and a constant voltage is applied to the combination, the current flowing will be a linear function of the height of the fuel in the measuring condenser (assuming constant dielectric constant). An optimum value of the linearizing condenser has been found which minimizes errors such that the new hyperbolic function affords simple linearization and adds no significant errors over the exponential function.

A better understanding of the invention will be had after reading the following detailed description with reference to the appended drawings in which.

Figure 1:
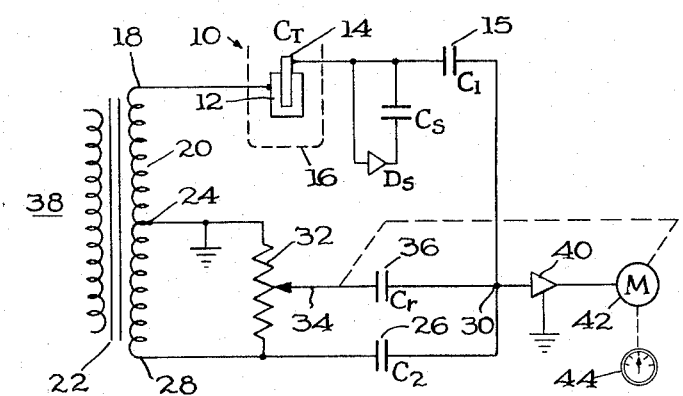
FIG. 1 is a circuit diagram of a single fluid container measuring unit embodying the present invention.

Referring to FIG. 1, there is shown the essential requirements of a circuit for indicating the mass of fluid in a container. A measuring condenser 10 having a capacitance $C_t$ and having a pair of electrodes 12 and 14 is provided for immersion in each of the containers 16. The electrode 12 is connected to the end terminal 18 of the secondary winding 20 of transformer 22. The secondary winding 20 is provided with a center tap 24 which is shown connected to ground. A condenser 26 having a fixed capacity $C_2$ is connected between the free end terminal 28 of the winding 20 and a junction point 30. Connected in series with the measuring condenser 10 is a linearizing condenser 15 with a capacity $C_1$. Because a shield capacitance $C_s$ may exist between $C_t$ and $C_1$, a shield driving amplifier $D_s$ is needed, otherwise varying shield capacity would change the effective value of $C_1$. If the shield capacity is small or does not vary, $D_s$ can be eliminated. A rebalancing potentiometer 32 is connected across the lower half of the winding 20 between the center tap 24 and the terminal 28. The slider 34 of the potentiometer is connected through a condenser 36 of capacity $C_r$ to the junction point 30. The electrode 14 of the measuring condenser, then, is connected in series with condenser 15 to junction 30. The transformer 22 is provided with a primary winding 38 which may be connected to a source of alternating current. An amplifier 40 has its input connected to the output of the bridge circuit between junction 30 and ground. The output of the amplifier 40 is coupled to a conventional two-phase rebalancing motor 42 which is mechanically coupled both to an indicator 44 and to the slider 34 of the potentiometer 32. In the circuit thus described if there is any change in capacity of condensers 10, a signal will be supplied to the motor 42 causing it to re-position the slider 34 in a direction tending to reduce the signal to zero and rebalance the bridge.

Figure 2:
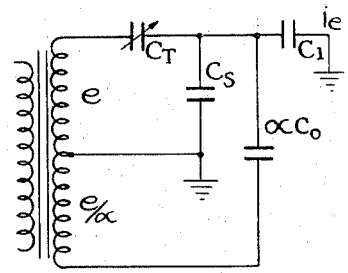
FIG. 2 is a circuit diagram indicating a possible configuration employed by the theory in the present invention.

By placing condenser 15 in series with measuring condenser 10 the series combination becomes linear with respect to the volume and dielectric constant or percent of mass of fluid in the container. The resultant function, being hyperbolic, is not exactly exponential and therefore will introduce a slight additional error, adding to the (standard deviation) error which is caused by the deviation of real fuels from the (assumed) exponential fuel law $(K-1=(AD)^n)$. An optimum value of $C_1$ has been found which minimizes these errors such that the new function has the advantage of simple linearization and adds no significant errors over the exponential one. For example, according to FIG. 2, the case has been examined where:

$Y$=Non-dimensionalized capacity profile
$i_e$=output current
$C_o$=empty capacity of tank unit
$C_s$=shield capacity
$\Delta C$=effective capacity of tank unit
$C_t$=$\alpha$-proportionality constant $C_o + Y\Delta C(K-1)$ We have then:

$$i_e = \frac{C_1}{C_s + C_1 + \alpha C_o + \Delta C(K-1)Y} ew\Delta C(K-1)Y$$

Set: $A = ew$
$B = C_1 + C_o + \alpha C_o + C_s$ $i_e[B + \Delta C(K-1)Y] = AC_1 \Delta C(K-1)Y$ $$Y = \frac{Bi_e}{(K-1)\Delta C(AC_1 - i_e)} \quad (1)$$

$$i = \frac{AC_1 \Delta C(K-1)Y}{B + \Delta C(K-1)Y} \quad (2)$$

Let us arbitrarily set A so that $i_e = 1$ if $Y = 1$; $i_e = 0$ if $Y = 0$

This only normalizes the output without losing generality.

$(K-1)\Delta C A C_1 - (K-1)\Delta C = B$ $$A = \frac{B + (K_1 - 1)\Delta C}{(K_1 - 1)\Delta C C_1} \quad (3)$$

$K_1$ here is the nominal K the guage is calibrated for.

We now determine the error in mass (or $i_e$) produced when density and dielectric constant change while volume stays the same.

Let us assume that $(K-1)$ changes by a factor of M, accompanied by a density change of N and the fluid height stays the same. (This requires addition of fluid.) We then calculate first $i_e$ for the case of $(K-1)$ and D and then $i_e$ for the case of $(K-1)M$ and DN. $i_e$ should then be equal to $Ni_e$ because the volume of fluid remained the same and its density increased by N. Total mass, which is indicated by $i_e$, therefore increases by a factor N.

From Equation 2 we get:

$$i_e - i_e N = \frac{C_1 A \Delta C(K_1 - 1)MY}{B + \Delta C(K_1 - 1)MY} - \frac{C_1 A \Delta C(K_1 - 1)NY}{B + \Delta C(K_1 - 1)Y}$$

$$E = \frac{C_1 A \Delta C(K_1 - 1)Y[MB + M\Delta C(K_1 - 1)Y - BN - \Delta C(K_1 - 1)MNY]}{(B + \Delta C(K_1 - 1)MY)(B + \Delta C(K_1 - 1)Y)}$$

$$A = \frac{B + (K_1 - 1)\Delta C}{(K_1 - 1)\Delta C C_1} \text{ from} \quad (3)$$

$$E = \frac{Y[B + (K_1 - 1)\Delta C][B(M-N) - \Delta C(K_1 - 1)YM(N-1)]}{(B + \Delta C(K_1 - 1)MY)(B + \Delta C(K_1 - 1)Y)} \quad (4)$$

Equation 4 shows that, once an optimum B has been found for a certain nominal $K_1$ and a set of M and N, this optimum is independent of $C_o$, $\alpha$, and $C_1$, as long as B stays the same. This gives considerable freedom of design.

The following numerical examples show that the method is accurate enough so that its errors are small compared with errors due to the variability of fuels. These variations cannot be avoided even by an ideal gauge; errors introduced, therefore, should be compared to this value. For example, deviations from the $K-1$ vs. D relationships are in the order of $\sigma \pm .8\%$ which is equivalent to about a 2.5% total error.

The table shows a sample profile for an optimum value of B where $K_1$ is set at 2 and $K-1$ changes by a factor of 1.1 and D changes by a factor of 1.076, these values being derived from the relationship $K-1 = 1.377 D^{1.3}$ which matches aviation fuels best, and a range of density of $\pm 7.5\%$ which is the range encountered for all Milspec conditions.

| Mass Percent of Full | E Percent of Full | $Y = \frac{C_t - C_o}{\Delta C(K-1)}$ |
|---|---|---|
| .05 | .11 | .03 |
| .10 | .20 | .07 |
| .15 | .29 | .11 |
| .20 | .35 | .15 |
| .25 | .41 | .19 |
| .30 | .45 | .23 |
| .35 | .47 | .28 |
| .40 | .48 | .32 |
| .45 | .48 | .37 |
| .50 | .46 | .42 |
| .55 | .42 | .47 |
| .60 | .38 | .52 |
| .65 | .31 | .57 |
| .70 | .24 | .63 |
| .75 | .15 | .68 |
| .80 | .04 | .74 |
| .85 | −.06 | .80 |
| .90 | −.19 | .86 |
| .95 | −.34 | .93 |
| 1.00 | −.50 | 1.00 |

Figure 3:
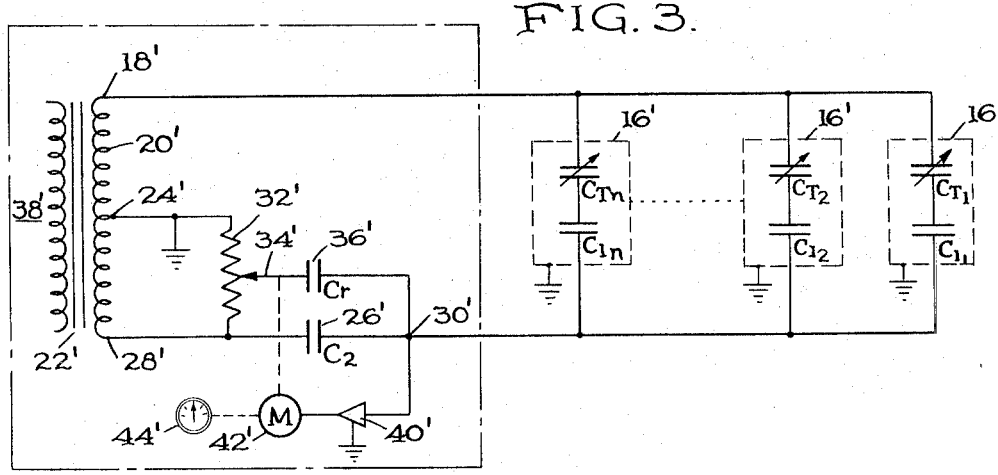
FIG. 3 is a circuit diagram of a plurality of individually linearized fluid container units connected to a totalizer indicator.
Figure 4:
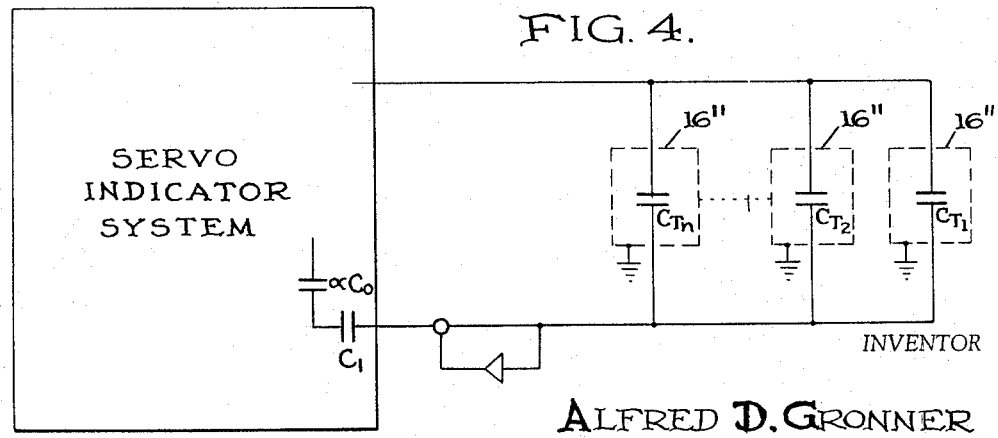
FIG. 4 is a circuit diagram indicating a modification of the FIG. 3 embodiment.

In FIG. 3 a system uses several (say $n$) individually linearized tank units. Components illustrated there corresponding to similar components illustrated in FIG. 1 are designated by like-number reference symbols but primed. In the FIG. 3 embodiment the shield capacity between $C_t$ and $C_1$ becomes very small because $C_1$ is now mounted in the tank unit. Therefore, no shield driving amplifier is needed. However, as shown in FIG. 4, the capacitors $C_1$ may be replaced by a single capacitor $C_1$ and a driving shield amplifier is needed. However, as shown in FIG. 4, the capacitors $C_1$ may be replaced by a single capacitor $C_1$ and a driving shield amplifier $D_s$ used.

As can be seen from the table, errors vary with fluid height. If several tank units are used, as in FIG. 3, not all of them are filled to the maximum error height. It is difficult to evaluate the total error under these conditions especially because errors in different tank units can be positive and negative, compensating each other. Under these circumstances, the best way to evaluate errors is to use the total root mean square value as a criterion. For $n$ tank units this amounts to:

$$E \text{ total} = \frac{1}{n}\sqrt{nE} = \frac{1}{\sqrt{n}}E$$

for four tank units this gives a total maximum of .25% and for six tank units of .2% (assuming the maximum error of the individual tank unit to be .5%). Further, as attitude angles increase, the difference between the filling levels of the various tank units increases, thereby insuring small errors in at least some tank units. This improves the probability of small overall errors in the "semi-exponential" or "hyperbolic" system at the time when errors due to attitude are larger. The system shown in FIG. 3, therefore, has negligible additional error over existing fuel systems. In addition, this system, in producing passive linearization by using only a condenser, makes it possible to replace a linear tank unit with its compensator by a "hyperbolic" gauge without a compensator. Thus, not only is a reduction in weight achieved but compensator derived errors are eliminated.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

What I claim is:

1. Capacitance fluid measuring apparatus for indicating the mass of fluid in a container when the relationship between the dielectric constant (K) and density (D) of the fluid being measured is for the range of fluids defined within predetermined tolerable limits by the exponential equation $$K-1 = AD^n$$

where A and $n$ are constants with $n$ being other than 0 or 1 comprising in combination: a measuring condenser having spaced electrodes immersed in the fluid in the container, a reference condenser having a normally fixed capacity, a source of alternating voltage for producing a first phase of current which is a function of the capacity of said measuring condenser, a third condenser connected in series with said measuring condenser for producing a passive linear relationship between the capacity of said measuring condenser and the volume and dielectric constant of the fluid in said container, a second source of variable attenuating voltage, circuit means connecting said reference condenser to said second variable source of attenuating voltage for producing a component of current opposite in phase to said current of said first phase and proportional to the magnitude of said variable source of voltage, means connected between a first output point common to said voltage sources and a second output point common to said measuring condenser and said reference condenser and responsive to any output voltage resulting from the current of said first phase and the current of said opposite phase, for adjusting the magnitude of said variable source of voltage in a direction to reduce said output voltage to zero, and means responsive to the adjustment of said variable source of voltage for indicating the mass of fluid in the container.

2. Capacitance type fluid measuring apparatus according to claim 1, wherein A and $n$ have the approximate values, respectively, of 1.377 and 1.3 when D is expressed in terms of grams per cubic millilitre.

3. Capacitance type fluid measuring apparatus for indicating the mass of fluid in a plurality of containers when the relationship between the dielectric constant (K) and the density (D) of the fluid being measured is for the range of fluids to be measured defined within predetermined tolerable limits by the exponential equation $$K-1 = (AD)^n$$

where A and $n$ are constants with $n$ being other than 0 or 1, comprising in combination a plurality of container measurement units corresponding to said containers and electrically connected in parallel each unit including a measuring condenser for producing a signal having spaced electrodes immersed in said fluid and a second condenser connected in series therewith for effecting a mathematical linear relationship between the capacity of said measuring condenser and the percent mass of said fluid, a source of alternating voltage, a bridge circuit connected to said source of voltage for comparing a reference signal with the measured signal furnished by said measuring capacitors, means for amplifying the resultant signal proportional to the difference of said measured and reference signals and means responsive to said resultant signal for restoring said bridge to a balanced position including means responsive to the adjustment of said bridge for indicating the mass of fluid in said containers.

4. Capacitance type fluid measuring apparatus according to claim 3, wherein A and $n$ have the approximate values, respectively, of 1.377 and 1.3 when D is expressed in terms of grams per cubic millilitre.

5. Capacitance type fluid measuring apparatus for indicating the mass of fluid in a plurality of containers, the dielectric constant of the fluid being representative within predetermined tolerable limits of the density of the same fluid within the range of fluids to be measured, comprising in combination: a first circuit including a first alternating voltage source and a plurality of measuring condensers connected in parallel corresponding to said containers and each having spaced electrodes immersible in the fluid in one of said containers, a second condenser connected in series with each of said measuring condensers to thereby effect a linear functional relationship between the capacity of said measuring condenser and the volume and dielectric constant of the fluid in said containers, a second circuit including a variable source of alternating voltage out of phase with said first voltage source, a reference condenser, an amplifier common to said two circuits and connected to receive the output, respectively, thereof, means operable under the control of said amplifier for varying said first voltage source and the variable voltage source of said second circuit in response to differential current output from said circuits in a direction tending to reduce said output current substantially to zero, and indicating means under control of said last named means for indicating the mass of fluid in the containers.

6. Capacitance type fluid measuring apparatus for indicating the mass of fluid in a plurality of containers, the dielectric constant of the fluid being representative within predetermined tolerable limits of the density of the same fluid within the range of fluids to be measured, comprising: a first circuit including a first alternating voltage source and a plurality of measuring condensers connected in parallel corresponding to said containers and each having spaced electrodes immersible in the fluid in one of said containers, a second condenser and a driving amplifier connected in parallel with said measuring condensers to thereby effect a linear functional relationship between the capacity of said measuring condenser and the volume and dielectric constant of the fluid in said containers, a second circuit including a variable source of alternating voltage out of phase with said first voltage source, a reference condenser, an amplifier common to said two circuits and connected to receive the output, respectively, thereof, means operable under the control of said amplifier for varying said first voltage source and the variable voltage source of said second circuit in response to differential current output from said circuits in a direction tending to reduce said output current substantially to zero, and indicating means under control of said last named means for indicating the mass of fluid in the containers.

7. A capacitance fluid measuring apparatus for indicating the mass of fluid in a container comprising a first circuit including a measuring condenser having spaced electrodes immersed in said fluid, a linearizing capacitor connected in series with said measuring condenser and an A.C. voltage source for energizing said measuring condenser, a second circuit including a fixed source of A.C. voltage and a variable source of A.C. voltage, a fixed reference capacitor, an amplifier having an input circuit common to said two circuits, varying means controlled by said amplifier for varying said second circuit voltage so as to reduce the current output of said amplifier to substantially zero, indicating means under control of said varying means, said means being controlled by said amplifier, said first and second voltage sources having a predetermined phase relationship whereby the current from said first circuit is essentially opposite in phase to the current from said second circuit.

8. A capacitance fluid measuring apparatus for indicating the mass of fluid in a plurality of containers comprising a first circuit including a plurality of measuring condensers connected in parallel and corresponding to said containers, a linearizing capacitor connected in series with said measuring condensers, a driving amplifier, and an A.C. voltage source for energizing said measuring condensers, a second circuit including a fixed source of A.C. voltage and variable source of A.C. voltage, a fixed reference capacitor, an amplifier having an input circuit common to said two circuits, varying means controlled by said amplifier for varying said second circuit voltage so as to reduce the current output of said amplifier to substantially zero, indicating means under control of said varying means, said means being controlled by said amplifier, said first and second voltage sources having a predetermined phase relationship whereby the current from said first circuit is essentially opposite in phase to the current from said second circuit.

References Cited by the Examiner
UNITED STATES PATENTS

| | | | |
|---|---|---|---|
| 2,677,964 | 5/1954 | Engelder | 73—304 |
| 2,833,147 | 3/1958 | Di Franco | 73—304 |
| 2,981,105 | 4/1961 | Ryder | 73—304 |

LOUIS R. PRINCE, *Primary Examiner.*

S. H. BAZERMAN, *Assistant Examiner.*